United States Patent [19]
Adcock

[11] 3,992,094
[45] Nov. 16, 1976

[54] CONTROLLED-DISTORTION PHOTOCOPYING APPARATUS

[76] Inventor: Kenneth E. Adcock, 10082 Jon Day Drive, Huntington Beach, Calif. 92646

[22] Filed: Nov. 24, 1975

[21] Appl. No.: 634,543

[52] U.S. Cl. .................................. 355/84; 355/52
[51] Int. Cl.² ................................... G03B 27/10
[58] Field of Search ................ 355/81, 84, 126, 52

[56] References Cited
UNITED STATES PATENTS

| | | | |
|---|---|---|---|
| 3,374,724 | 3/1968 | Torres | 355/52 |
| 3,445,165 | 5/1969 | Dubbs | 355/84 |
| 3,767,301 | 10/1973 | Solo | 355/84 |

*Primary Examiner*—Monroe H. Hayes
*Attorney, Agent, or Firm*—Theodore H. Lassagne

[57] ABSTRACT

Controlled-distortion photocopying apparatus comprises a bifurcate drive mechanism the forks of which are angularly adjustable with respect to each other. Each fork propels a film carriage along a path normal to an exposure slit provided in a film mask disposed between the film carriages and a light source. A transparency to be copied is carried beneath the exposure slit by one carriage and a sensitized film carried beneath the transparency by the other carriage. The dimension of the photocopy normal to the long dimension of the exposure slit is either decreased or increased according to which carriage carries the sensitized film and which the transparency; the magnitude of the dimensional change depending upon the angle between the forks of the drive mechanism.

8 Claims, 5 Drawing Figures

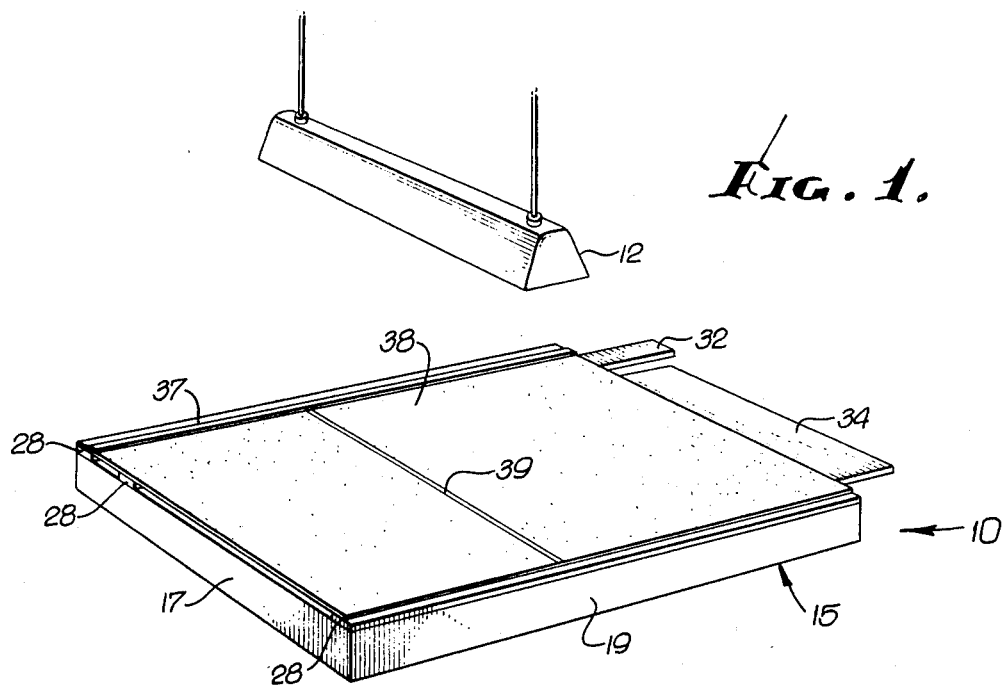
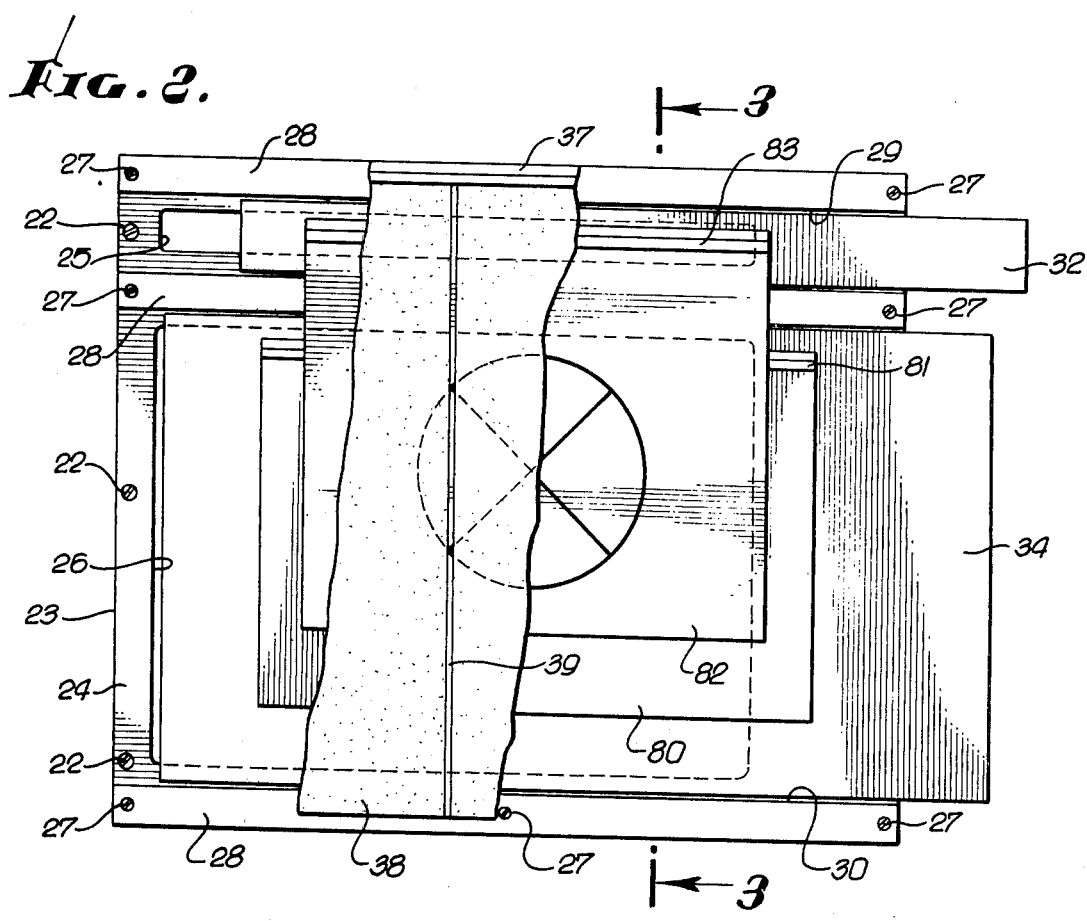

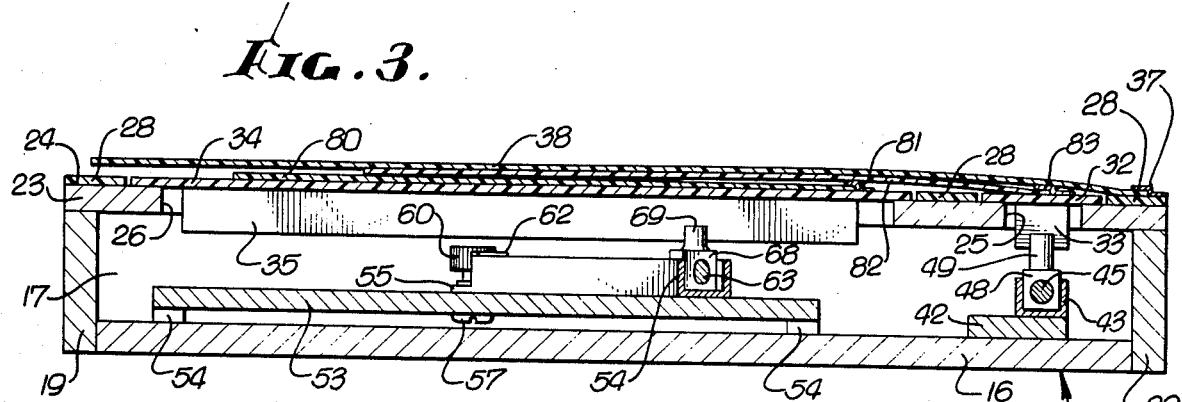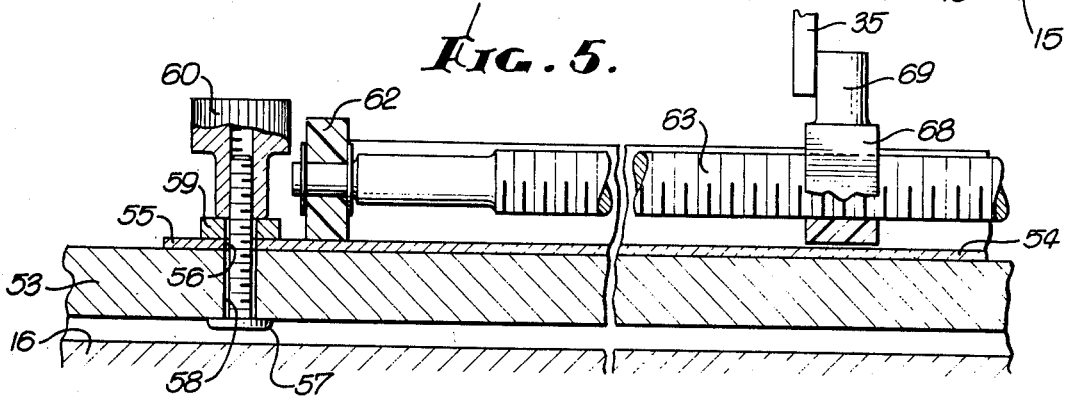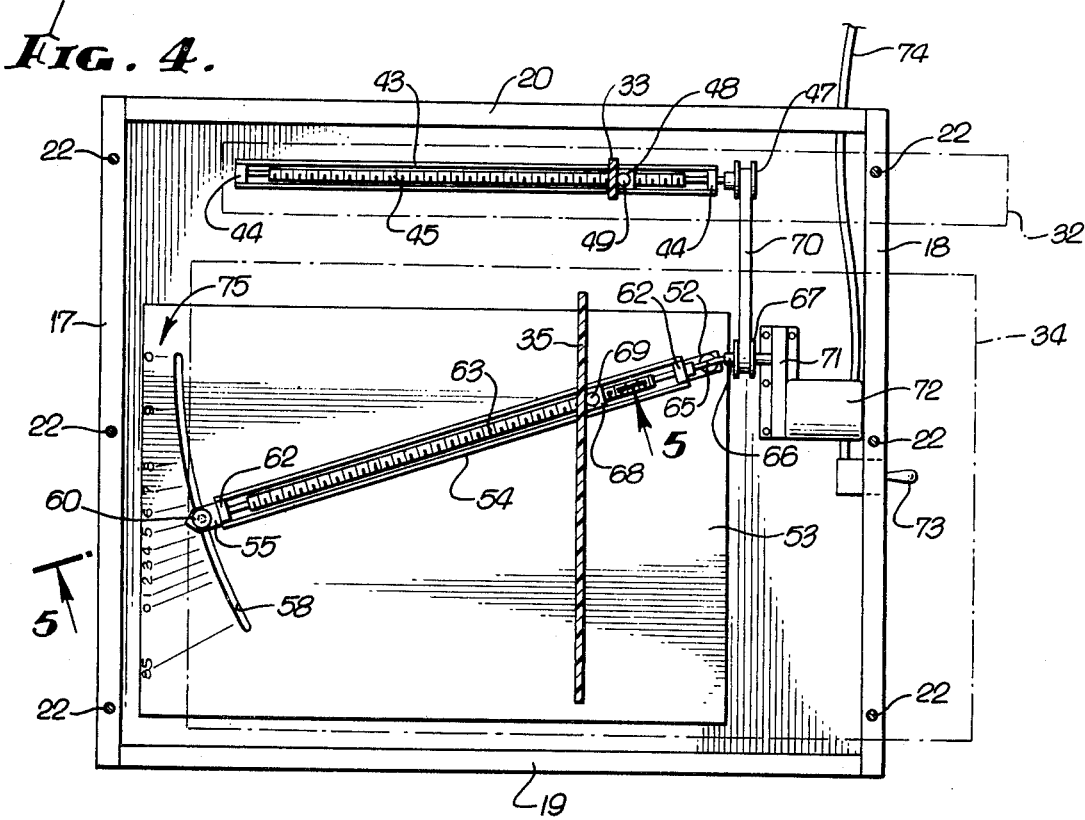

CONTROLLED-DISTORTION PHOTOCOPYING APPARATUS

BACKGROUND OF THE INVENTION

1. Field of the Invention

The present invention relates to photocopying apparatus and more particularly to apparatus for making copies of film images having one dimension of the copy shortened or lengthened with respect to the copied image, while the dimension perpendicular thereto is unchanged.

2. Description of the Prior Art.

Contact copies of photographic images having one dimension shortened or lengthened with respect to the copied image while the dimension perpendicular thereto is unchanged frequently are needed by graphic designers who design for rubber plate reproduction as well as for the purpose of accommodating graphic art to space requirements.

To meet these needs various forms of photographic distortion devices have been developed. Some consist essentially of a pair of relatively movable film carriages capable of moving separate films is superposed relationship, both with respect to each other and to an exposure slit, and means for varying the relative rates of movement of the two carriages past the slit. Examples of such apparatus are disclosed in the U.S. patents of Adams et al. No. 3,126,809 and of Dubbs No. 3,445,165.

The primary object of the present invention is to provide a device of the class described which can be more economically produced and more easily adjusted and operated than similar known devices.

Further objects and advantages of the present invention will become apparent from the description hereinafter of a preferred embodiment.

SUMMARY OF THE INVENTION

The foregoing objects and advantages are achieved by the provision of a bifurcate drive mechanism powered by a common source. The forks of this mechanism are angularly adjustable with respect to each other, and each drives one of two film carriages each constrained to move along a path normal to an exposure slit provided in a film mask disposed between the film carriages and a light source.

In operation, the two film carriages carry, in superposed relationship, respectively, a transparency portraying the matter to be copied and, underlying it, a sensitized film; the film mask with its exposure slit overlying both.

If the two forks of the drive mechanism are adjusted into parallelism with each other, the two carriages and the films carried by them will move past the exposure slit at the same rate and the matter portrayed on the transparency will be copied on the sensitized film unaltered.

If one fork of the drive mechanism is adjusted into an angular relationship with respect to the other, however, one of the carriages and the film carried by it will move past the exposure slit at a rate different than the rate at which the other carriage and its film is being moved past the slit. Under such circumstances the matter copied onto the sensitized film will be altered in its dimension parallel to the paths of carriage movement, but unaltered in its dimension normal thereto. The dimension of the photocopy parallel to the path of the carriage carrying the transparency to be copied will be decreased if the carriage carrying the sensitized film is propelled by the fork of the driving mechanism which is disposed at an angle to that path, but will be increased if the carriage carrying the transparency to be copied is propelled by that fork. In either case the magnitude of the decrease or increase will vary as the angle between the forks of the driving mechanism is varied although not in a linear relationship therewith.

BRIEF DESCRIPTION OF THE DRAWING

FIG. 1 is a perspective view of controlled-distortion photocopying apparatus embodying the present invention, showing the same in operating relationship to a separate light source;

FIG. 2 is a plan view of the apparatus of FIG. 1 with portions of the film mask broken away to expose portions of the apparatus underlying the same;

FIG. 3 is a view in vertical section taken on the line 3—3 of FIG. 2;

FIG. 4 is a plan view of the apparatus of FIG. 1, in which the two film carriages are shown only in dot dash lines except for their propulsion flanges which are shown in section; and FIG. 5 is a detail view, partly in section, taken on the line 5—5 of FIG. 4, of a portion of the angularly adjustable fork of the carriage propulsion mechanism.

DETAILED DESCRIPTION OF THE PREFERRED EMBODIMENT

As shown in the accompanying drawing, the apparatus comprises a portable assembly 10 adapted to be placed upon a table or the like (not shown) so that its upper surface can be exposed to ambient light as from a light source 12.

The assembly 10 comprises a housing 15, which may be of wood or metal, having a bottom 16 (FIG. 3), sides 17 and 18, a front 19, and a back 20.

Secured to the sides 17 and 18, as by screws 22, is a top 23 presenting a surface 24 which has an upper cut-out portion 25 and a lower cut-out portion 26, both extending laterally thereof to adjacent the sides 17 and 18.

Secured to the top 23, as by screws 27, are three strips 28 of plastic or similar material so spaced with respect to the cut-out portions 25 and 26 of the top 23 as to provide a first carriage guideway 29 and a second carriage guideway 30 (FIG. 2) between the sides of which the respective cut-out portions 25 and 26 lie.

Means constituting a first film carriage are provided in the form of a flat strip 32 of plastic material slidable within the first carriage guideway 29 and having fixed to and depending from its under side a propulsion flange 33 (FIGS. 3 and 4). Means constituting a second film carriage are provided in the form of a sheet 34 of similar material, having fixed to and depending from its under side a propulsion flange 35.

Hinged to the uppermost strip 28, as by an adhesively secured strip of cloth or the like 37, is a film mask 38 the entire area of which, except for an exposure slit 39 extending normal to the paths of movement of film carriages 32 and 34, is opaque to photographically actinic light.

Means comprising a bifurcate driving mechanism are provided for propelling the film carriages 32 and 34 along their respective guideways 29 and 30. One fork thereof includes, secured to a base block 42 (FIG. 3) fixed to the bottom 16 of the housing 15, a slide housing 43 (see also FIG. 4) in the form of a non-circular metal channel open at its top and paralleling the path of movement of the first film carriage 32. Fixed adjacent the ends of the slide housing 43 are bearing blocks 44 of nylon or the like in which is journaled a worm 45 of steel or the like, the rightmost end of which has fixed thereto a pulley 47. Threaded upon the worm 45 is a non-circular slide 48 slidably fitting within the channel 43 and provided with a carriage-propelling pin 49 projecting from its upper side. This pin is engageable with a side of the flange 33 depending from the upper film carriage 32. This arrangement is such that, upon rotation of the worm 45, the slide 48 will be moved laterally within the slide housing 43 and the pin 49 by engagement with a side of the flange 33 will impart such movement to the upper film carriage 32.

The other fork of this driving mechanism includes, pivotally secured at 52 (FIG. 4) to a base block 53 provided with feet 54 securing it in spaced relation to the bottom 16 of the housing 15, a second slide housing 54 in the form of a noncircular channel open at its top. A planar extension 55 of the slide housing 54 (FIG. 5), pointed to form an indicator, extends beyond the channel shaped portion thereof at the end remote from the pivot 52, and an aperture 56 in the extension 55 receives a headed bolt which extends upwardly through an arcuate slot 58 (see also FIG. 4) in the base block 53; the head of the bolt 57 being engageable with the under side of the base block 53. Threaded on the upper end of the bolt 57 and bearing against a washer 59 is a thumb screw 60. This arrangement is such that the slide housing 54 is adjustably positionable in a plane paralleling the plane of movement of the second film carriage 34, about its pivot 52 which lies at the center about which the arcuate slot 58 is inscribed. In this way it can be positioned to any of a series of positions at an acute angle to said first fork and secured in such desired position by tightening the thumb screw 60.

Fixed adjacent the ends of the channel shaped portion of the slide housing 54 are bearing blocks 62 in which is journaled a worm 63 of the same pitch as worm 45. Fixed to the end of the worm 63 adjacent the pivotal mounting 52 of the slide housing 54 and extending approximately equidistantly on each side of the center of the pivotal mounting 52 is a short section of flexible shaft 65 the opposite end of which is connected to the shaft 66 of a pulley 67 of the same diameter as pulley 47. Threaded upon the worm 63 is a slide 68 slideably fitting within the channel 54 and provided with a carriage-propelling pin 69 projecting from its upper side. This pin is engageable with a side of the flange 35 depending from the lower film carriage 34. It will be observed that the flange 35 is of sufficient length so that the carriage-propelling pin 69 will engage a side of it regardless of the angular position, within the length of the arcuate slot 58, to which the slide housing 54 is adjusted.

Means are provided for synchronously rotating the worms 45 and 63; said means being reversible under the control of an operator so that the film carriages 32 and 34 may be moved laterally in either direction. Pulleys 47 and 67 are connected as by a belt 70, and the shaft 66 to which the pulley 67 is fixed is rotatably mounted in a gear box 71 fixed to the bottom 16 of the housing 15. A reversible motor 72 controlled by a reversing switch 73 interposed in the power supply line 74 drives the gear box 71 and through it pulleys 67 and 47.

When it is desired to employ the apparatus of the present invention in preparing a copy of a film image having one dimension of the copy shortened with respect to the copied image, but with the dimension perpendicular thereto unchanged, the film mask 38 is lifted and folded back on its hinge 37, the lower film carriage 34 is lifted out of its guideway 30 to afford access to the thumb screw 60 and, with the thumb screw 60 loosened, the slide housing 54 is adjusted to any of a series of predetermined angular positions in relation to the slide housing 43, which will give the desired degree of shortening of the reproduced image. It will be apparent that when the slide housing 54 is parallel with the slide housing 43; i.e., when the pointed end of the slide housing 54 is at zero on the scale 75 (FIG. 4), the worms 45 and 63 will be parallel, so that the upper and lower film carriages 32 and 34 will travel at the same speed, and there will be no distortion of the copied image. However, if the slide housing 54 constituting one fork of the drive mechanism is adjusted into an angular relationship with respect to the slide housing 43 constituting the other fork of the driving mechanism, the carriage 34 will move at a rate different than the rate at which the carriage 32 is moved laterally, the difference in the speeds of the two varying with the magnitude of the angle between the two forks of the driving mechanism although not in a linear relationship.

When this preliminary adjustment has been made, the lower film carriage 34 is restored to its normal position in the lower guideway 30 and, the mask 38 being folded back on its hinge 37, a photo-sensitive medium such as, for example, a sensitized film or paper 80, is, under a safe light, temporarily attached to the lower film carriage 34 by means such as a strip of pressure-sensitive tape 81. Next, a transparency 82 carrying the image to be copied is temporarily attached by means such as a strip of pressure-sensitive adhesive tape 83 to the upper film carriage 32 with the image to be copied overlying the sheet 80. Then, with the mask 38 restored to the position in which it is shown in the drawing and the pins 49 and 69 positioned rightwardly far enough so that when the flanges 33 and 35 are leftward of said pins, the image carried by the transparency 82 is not under the exposure slit 39, the exposure light 12 is turned on and motor operation is initiated in the proper direction to cause the pins 49 and 69 to propel the film carriage 32 and 34 leftwardly, as viewed in FIGS. 1, 2 and 4, until the image carried on the transparency 82 has passed completely under the exposure slit 39. This operation, with the slide housing 54 adjusted, for example, to the position in which it is shown in FIG. 4, will cause the image carried by the transparency 82 to be copied onto the sensitized film or paper 80 with the lateral dimension shortened, but with the dimension perpendicular thereto unchanged.

If the operation is to be repeated either with the same or another image to be copied, it is not necessary to restore the pins 49 and 69 to the position they occupied before the commencement of the last preceding operation, it being sufficient merely to reposition the carriages 32 and 34 so that the flanges 33 and 35 are on the rightward side of the pins 49 and 69 instead of on the leftward side thereof as they were at the commencement of the preceding operation. The second copying operation can then proceed with the carriages moving from left to right instead of from right to left.

If it is desired to increase instead of to shorten the lateral dimension of the copied image, as compared with the lateral dimension of the image being copied, this can be accomplished by temporarily attaching the transparency 82 carrying the image to be copied to the lower film carriage 34 (securing it in this case by means such as a pressure-sensitive adhesive strip along its lower edge) and attaching the sensitized paper or film 80 to the upper film carriage 32 in a position underlying the transparency 82. The image copied will, in this arrangement of the parts, have its lateral dimension lengthened with respect to the copied image, while the dimension perpendicular thereto remains unchanged.

I claim:

1. A controlled-distortion photocopying apparatus comprising a base having a surface provided with parallel first and second carriage guideways, first and second film carriages slideable along said guideways, respectively, and a film mask movable into and out of a position overlying said surface and having an exposure slit normal to the paths of movement of said film carriages; characterized by the provision of means for propelling said carriages along said guideways comprising a bifurcate driving mechanism having forks synchronously driven from a common source; one of said forks paralleling the path of movement of said first film carriage, and the other of said forks being adjustably positionable in a plane paralleling the plane of movement of said second film carriage, to any of a series of positions at an acute angle to said first fork.

2. Apparatus according to claim 1 in which said carriage propelling means is reversible and means controlled by an operator are provided for initiating operation thereof in either direction.

3. Apparatus according to claim 2 in which at least one of the forks of said driving mechanism includes a carriage propelling pin and the film carriage propelled by said fork includes a flange extending into the path of movement of said pin.

4. Apparatus according to claim 3 in which said carriage is removable from its guideway sufficiently to enable an operator to place said flange at either side of said pin.

5. Apparatus according to claim 1 in which at least one of the forks of said driving mechanism comprises a non-circular channel having a rotatable worm journaled therein, and a slide threaded on said worm and movable in response to rotation of said worm to effect propulsion of one of said film carriages.

6. Apparatus according to claim 5 in which said fork of said driving mechanism includes a carriage propelling pin carried by said slide and the film carriage propelled by said fork includes a flange extending into the path of movement of said pin.

7. Apparatus according to claim 6 in which said carriage is removable from its guideway sufficiently to enable an operator to place said flange at either side of said pin.

8. Apparatus according to claim 7 in which said carriage propelling means is reversible and means controlled by an operator are provided for initiating operation thereof in either direction.

* * * * *